US011963269B2

(12) United States Patent
Kajihara et al.

(10) Patent No.: US 11,963,269 B2
(45) Date of Patent: Apr. 16, 2024

(54) CERAMIC HEATER

(71) Applicant: NGK INSULATORS, LTD., Nagoya (JP)

(72) Inventors: Noboru Kajihara, Santa Clara, CA (US); Shuichiro Motoyama, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 363 days.

(21) Appl. No.: 17/132,416

(22) Filed: Dec. 23, 2020

(65) Prior Publication Data

US 2021/0243846 A1 Aug. 5, 2021

(30) Foreign Application Priority Data

Feb. 3, 2020 (JP) ................................ 2020-016115

(51) Int. Cl.
*H05B 3/14* (2006.01)

(52) U.S. Cl.
CPC .................................... *H05B 3/143* (2013.01)

(58) Field of Classification Search
CPC ............. H05B 3/00; H05B 3/143; H05B 3/80
See application file for complete search history.

(56) References Cited

U.S. PATENT DOCUMENTS

| | | | |
|---|---|---|---|
| 2003/0089600 A1 | 5/2003 | Natsuhara et al. | |
| 2004/0175549 A1* | 9/2004 | Ito | C04B 35/5611 428/209 |
| 2018/0204754 A1* | 7/2018 | Tokusho | H01L 21/68792 |

FOREIGN PATENT DOCUMENTS

| | | | |
|---|---|---|---|
| CN | 102714172 A | | 10/2012 |
| CN | 106856184 A | | 6/2017 |
| JP | 63045814 A | * | 2/1988 |
| JP | S63-045814 A | | 2/1988 |
| JP | 2006-179897 A | | 7/2006 |
| JP | 2007-088484 A1 | | 4/2007 |
| JP | 2009-043589 A | | 2/2009 |
| JP | 2012-160368 A | | 8/2012 |
| JP | 2017-162878 A | | 9/2017 |
| KR | 10-2004-0030803 A | | 4/2004 |
| KR | 10-2052811 B1 | | 12/2019 |

OTHER PUBLICATIONS

Korean Office Action (with English Translation) dated Dec. 13, 2022 (Application No. 10-2021-0011328).

(Continued)

*Primary Examiner* — Janie M Loeppke
*Assistant Examiner* — Theodore J Evangelista
(74) *Attorney, Agent, or Firm* — BURR PATENT LAW, PLLC

(57) ABSTRACT

A ceramic heater includes a ceramic plate having a surface that serves as a wafer placement surface, resistance heating elements that are embedded in the ceramic plate, a tubular shaft that supports the ceramic plate from a rear surface of the ceramic plate, a recess that is formed in a within-shaft region of the rear surface of the ceramic plate, the within-shaft region being surrounded by the tubular shaft, and terminals that are disposed to be exposed at a side surface of the recess and that supply electric power to the resistance heating element.

7 Claims, 3 Drawing Sheets

(56) References Cited

OTHER PUBLICATIONS

Taiwanese Office Action (Application No. 109146176) dated Nov. 22, 2021.
Japanese Office Action (Application No. 2020-016115) dated Sep. 13, 2022 (with English translation).
Japanese Office Action (Application No. 2020-016115) dated Jan. 24, 2023 (with English translation).
Korean Office Action (with English translation) dated Jun. 16, 2023 (Application No. 10-2021-0011328).

* cited by examiner

CERAMIC HEATER

BACKGROUND OF THE INVENTION

1. Field of the Invention

The present invention relates to a ceramic heater.

2. Description of the Related Art

A ceramic heater for heating a wafer is used in a semiconductor manufacturing apparatus. The so-called two-zone heater is known as one type of such a ceramic heater. In the two-zone heater, an inner-peripheral-side resistance heating element and an outer-peripheral-side resistance heating element each made of a refractory metal are embedded in a ceramic plate, and heat generations from the resistance heating elements are controlled independently of each other by supplying electric powers to the resistance heating elements in an independent manner (see Patent Literature (PTL) 1). Terminals to supply the electric powers to the resistance heating elements are arranged within a region of a rear surface of the ceramic plate, the region being surrounded by a shaft.

CITATION LIST

Patent Literature

PTL 1: Japanese Unexamined Patent Application Publication No. 2007-88484

SUMMARY OF THE INVENTION

However, as the number of zones increases, the number of the resistance heating elements disposed in each of the zones also increases. This causes a difficulty in arranging the terminals of the resistance heating elements in the region of the rear surface of the ceramic plate, that region being surrounded by the shaft.

The present invention has been made with intent to solve the above-mentioned problem, and a main object of the present invention is to effectively utilize the region of the rear surface of the ceramic plate, that region being surrounded by the tubular shaft.

A ceramic heater of the present invention includes:

a ceramic plate having a surface that serves as a wafer placement surface;

a resistance heating element that is embedded in the ceramic plate;

a tubular shaft that supports the ceramic plate from a rear surface of the ceramic plate;

a recess that is formed in a within-shaft region of the rear surface of the ceramic plate, the within-shaft region being surrounded by the tubular shaft; and terminals that are disposed to be exposed at a side surface of the recess and that supply electric power to the resistance heating element.

According to the above-described ceramic heater, the recess is formed in a within-shaft region of the rear surface of the ceramic plate, the within-shaft region being surrounded by the tubular shaft. The terminals to supply the electric power to the resistance heating element are disposed to be exposed at the side surface of the recess. Thus, although those terminals are disposed to be exposed at the within-shaft region of the rear surface of the ceramic plate in the related art, they are disposed to be exposed at the side surface of the recess in the present invention. As a result, the within-shaft region of the rear surface of the ceramic plate can be effectively utilized.

In the ceramic heater according to the present invention, the recess may have a size equal to a size of the within-shaft region. With this feature, an area of a bottom surface of the recess can be increased, and the bottom surface of the recess can be effectively utilized. Here, the wording "the recess has a size equal to a size of the within-shaft region" includes not only the case in which an outer contour of the recess and an outer contour of the within-shaft region exactly match each other, but also the case in which there is a small difference between the outer contour of the recess and the outer contour of the within-shaft region.

In the ceramic heater according to the present invention, the resistance heating element may be disposed for each of a plurality of zones obtained by dividing the wafer placement surface, the terminals of some of the resistance heating elements disposed in the plurality of zones may be disposed to be exposed at the side surface of the recess, and the terminals of the remaining resistance heating elements may be disposed in the within-shaft region of the rear surface of the ceramic plate. With this feature, the terminals of the resistance heating elements disposed for each of the zones are arranged in a way distributed to the side surface of the recess and the within-shaft region of the rear surface of the ceramic plate. Comparing with the case in which the terminals of all the resistance heating elements are arranged in the within-shaft region of the rear surface of the ceramic plate, therefore, the within-shaft region can be more effectively utilized, for example, to arrange other members therein.

In the ceramic heater according to the present invention, the resistance heating element may include an inner-peripheral-side resistance heating element disposed in an inner-peripheral-side zone of the wafer placement surface and an outer-peripheral-side resistance heating element disposed in an outer-peripheral-side zone of the wafer placement surface, the terminals of the outer-peripheral-side resistance heating element may be disposed to be exposed at the side surface of the recess, and the terminals of the inner-peripheral-side resistance heating element may be disposed to be exposed at the within-shaft region of the rear surface of the ceramic plate. With this feature, since the distances between the inner-peripheral-side resistance heating element and the terminals thereof are shortened, those resistance heating element and terminal can be connected to each other directly or by a short wiring.

In the ceramic heater according to the present invention, the side surface of the recess may be located at a position visually recognizable from an end portion side of the tubular shaft. With this feature, in an operation of exposing the terminals at the side surface of the recess by drilling, a worker can relatively easily perform the drilling while looking at the side surface of the recess from the end portion of the tubular shaft.

The ceramic heater according to the present invention may further include power feeder members that are connected to the terminals and that are arranged in an inner space of the tubular shaft. With this feature, electric powers can be supplied to the resistance heating element by using the power feeder members. In such a case, the power feeder members connected to the terminals exposed at the side surface may be each formed in a shape following an inner wall of the tubular shaft. With this feature, the inner space of the tubular shaft can be effectively utilized for other purposes.

DETAILED DESCRIPTION OF THE INVENTION

Figure 1:
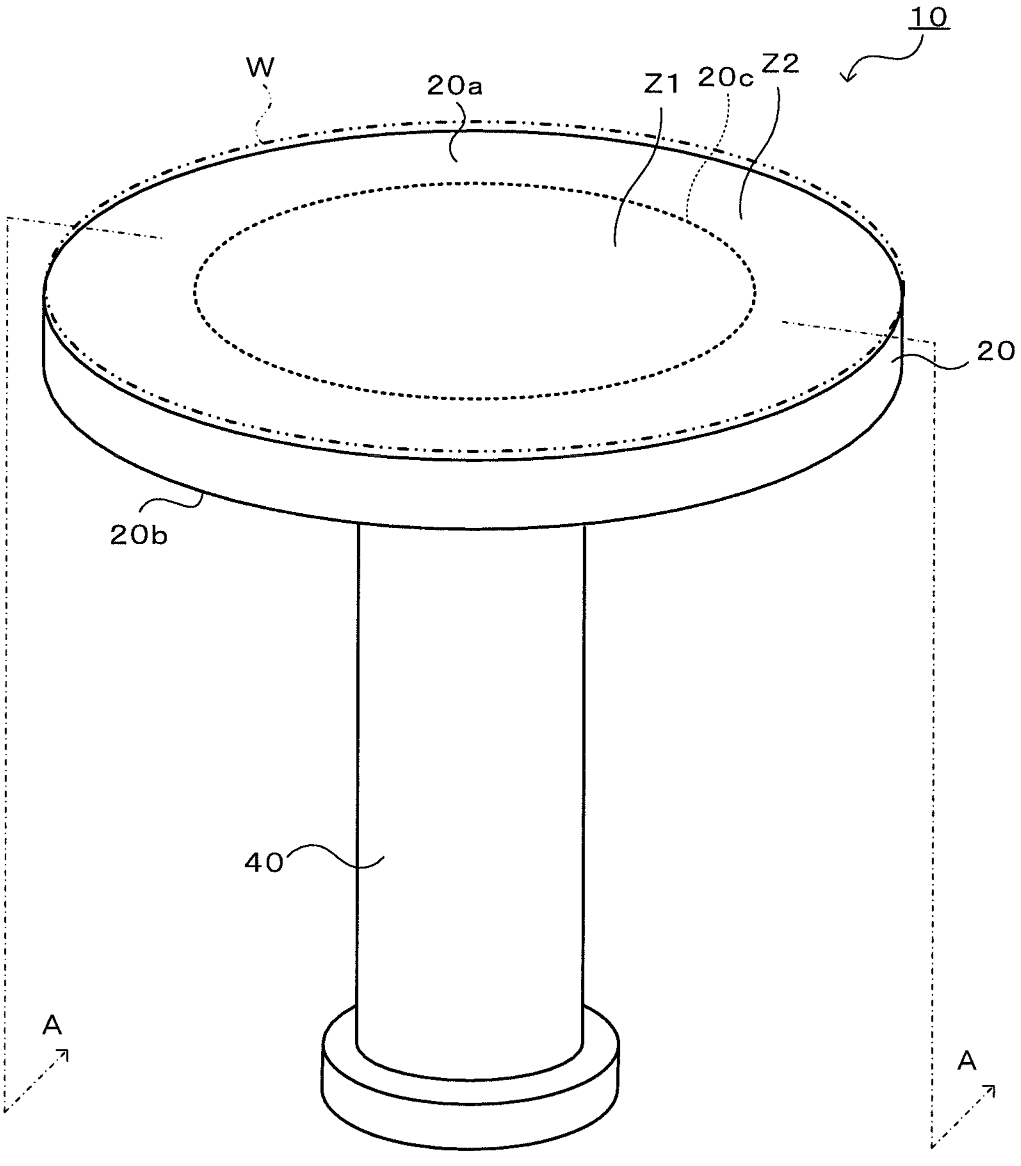
FIG. 1 is a perspective view of a ceramic heater 10.
Figure 2:
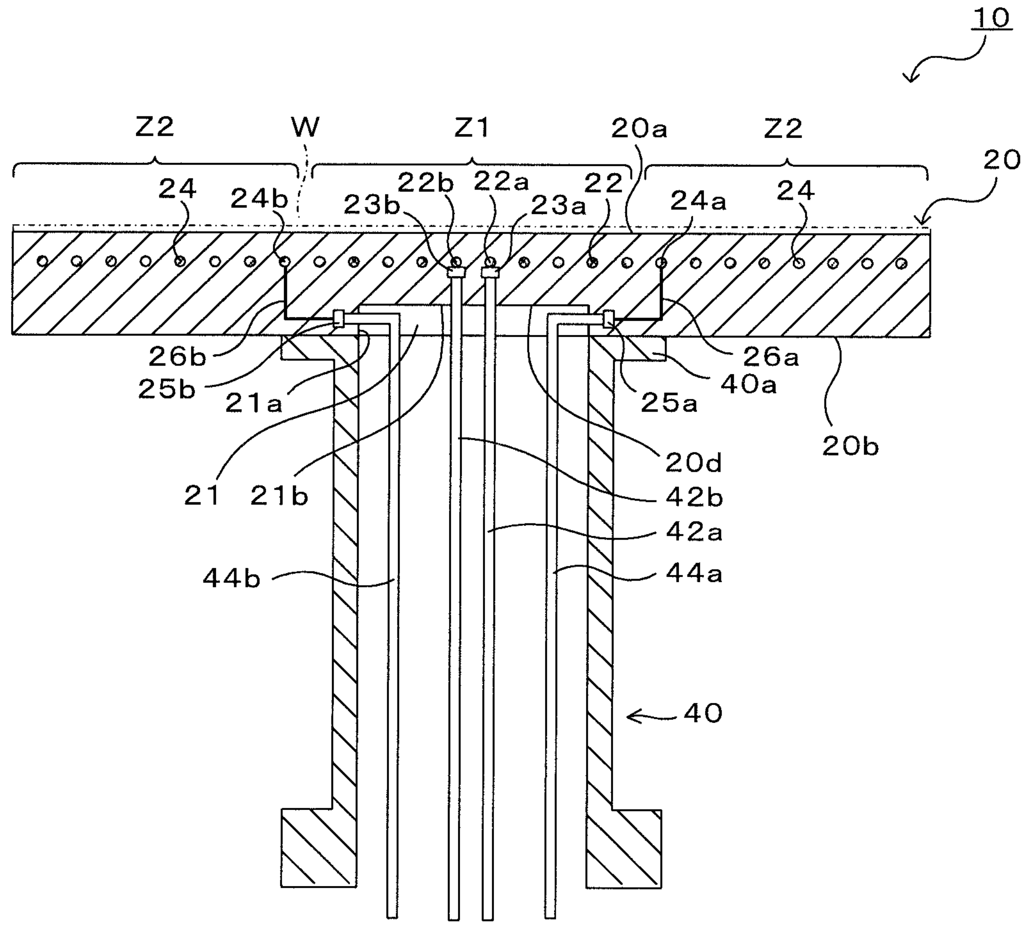
FIG. 2 is a sectional view (vertical sectional view) taken along A-A in FIG. 1.

A preferred embodiment of the present invention will be described below with reference to the drawings. FIG. 1 is a perspective view of a ceramic heater 10, and FIG. 2 is a sectional view taken along A-A in FIG. 1.

The ceramic heater 10 is used to heat a wafer W on which processing, such as etching or CVD, is to be performed, and is installed within a vacuum chamber (not illustrated). The ceramic heater 10 includes a disk-shaped ceramic plate 20 having a wafer placement surface 20*a*, and a tubular shaft 40 that is bonded to a surface (rear surface) 20*b* of the ceramic plate 20 opposite to the wafer placement surface 20*a*.

The ceramic plate 20 is a disk-shaped plate made of a ceramic material represented by aluminum nitride or alumina. The diameter of the ceramic plate 20 is not limited to a particular value and may be about 300 mm, for example. The ceramic plate 20 is divided into an inner-peripheral-side zone Z1 of a small circular shape and an outer-peripheral-side zone Z2 of an annular shape by a virtual boundary 20*c* (see FIG. 1) concentric to the ceramic plate 20. As illustrated in FIG. 2, an inner-peripheral-side resistance heating element 22 is embedded in the inner-peripheral-side zone Z1 of the ceramic plate 20, and an outer-peripheral-side resistance heating element 24 is embedded in the outer-peripheral-side zone Z2. The resistance heating elements 22 and 24 are each constituted by a coil containing, as a main component, molybdenum, tungsten, or a carbide of any one of those elements, for example.

The tubular shaft 40 supports the ceramic plate 20 from the rear surface 20*b* of the ceramic plate 20 and is made of a ceramic material, such as aluminum nitride or alumina, like the ceramic plate 20. A flange portion 40*a* at an upper end of the tubular shaft 40 is bonded to the rear surface 20*b* of the ceramic plate 20. When viewing the tubular shaft 40 from a lower end, the tubular shaft 40 is concentric to the ceramic plate 20. A recess 21 is formed in a region (within-shaft region 20*d*) of the rear surface of the ceramic plate 20, the region locating within the tubular shaft 40. The recess 21 is a circular groove with a size substantially equal to that of the within-shaft region In this embodiment, the inner diameter of the recess 21 and the inner diameter of the tubular shaft 40 are equal to each other, or the difference between both the inner diameters is very small. Therefore, a bottom surface 21*b* of the recess 21 substantially matches the within-shaft region 20*d*. A side surface 21*a* of the recess 21 is located at a position visually recognizable from a lower end side of the tubular shaft 40.

The inner-peripheral-side resistance heating element 22 is formed such that it starts from a start point 22*a* and reaches an end point 22*b* after being wired in a one-stroke pattern over substantially the entirety of the inner-peripheral-side zone Z1 while being folded at a plurality of turn-around points. The start point 22*a* and the end point 22*b* are disposed in the inner-peripheral-side zone Z1. The start point 22*a* and the end point 22*b* are directly connected, respectively, to a start point terminal 23*a* and an end point terminal 23*b* each having a tablet-like shape and made of the same material as the inner-peripheral-side resistance heating element 22. The start point terminal 23*a* and the end point terminal 23*b* are disposed such that both the terminals are embedded in the ceramic plate 20 and are exposed at the bottom surface 21*b* of the recess 21. Upper ends of linear power feeder members 42*a* and 42*b* each made of a metal (for example, Ni) are bonded respectively to the start point terminal 23*a* and the end point terminal 23*b*. The start point terminal 23*a* and the end point terminal 23*b* are exposed at the bottom surface 21*b* of the recess 21 before the power feeder members 42*a* and 42*b* are bonded. However, after the power feeder members 42*a* and 42*b* have been bonded, the start point terminal 23*a* and the end point terminal 23*b* are not exposed at the bottom surface 21*b* of the recess 21 because those terminals are covered with the power feeder members 42*a* and 42*b* and bonding layers.

The outer-peripheral-side resistance heating element 24 is formed such that it starts from a start point 24*a* and reaches an end point 24*b* after being wired in a one-stroke pattern over substantially the entirety of the outer-peripheral-side zone Z2 while being folded at a plurality of turn-around points. The start point 24*a* and the end point 24*b* are disposed in the outer-peripheral-side zone Z2. The start point 24*a* and the end point 24*b* are connected respectively, through jumper lines 26*a* and 26*b*, to a start point terminal 25*a* and an end point terminal 25*b* each having a tablet-like shape and made of the same material as the outer-peripheral-side resistance heating element 24. The start point terminal 25*a* and the end point terminal 25*b* are disposed such that both the terminals are embedded in the ceramic plate 20 at positions near the side surface 21*a* of the recess 21 and are exposed at the side surface 21*a* of the recess 21. L-shaped power feeder members 44*a* and 44*b* each made of a metal (for example, Ni) are bonded respectively to the start point terminal 25*a* and the end point terminal 25*b*. The start point terminal 25*a* and the end point terminal 25*b* are exposed at the side surface 21*a* of the recess 21 before the power feeder members 44*a* and 44*b* are bonded. However, after the power feeder members 44*a* and 44*b* have been bonded, the start point terminal 25*a* and the end point terminal 25*b* are not exposed at the side surface 21*a* of the recess 21 because those terminals are covered with the power feeder members 44*a* and 44*b* and bonding layers.

Inside the tubular shaft 40, there are arranged the power feeder members 42*a* and 42*b* connected respectively to the start point terminal 23*a* and the end point terminal 23*b* of the inner-peripheral-side resistance heating element 22, and the power feeder members 44*a* and 44*b* connected respectively to the start point terminal 25*a* and the end point terminal 25*b* of the outer-peripheral-side resistance heating element 24. In addition, an inner-peripheral-side thermocouple (not illustrated) for measuring a temperature in the inner-peripheral-side zone Z1 of the ceramic plate 20 and an outer-peripheral-side thermocouple (not illustrated) for measuring a temperature in the outer-peripheral-side zone Z2 of the ceramic plate 20 are also arranged inside the tubular shaft 40.

An example of manufacturing of the ceramic heater will be described below. First, a disk-shaped ceramic plate (with front and rear surfaces being flat) is prepared in which the inner-peripheral-side resistance heating element 22 and its terminals 23*a* and 23*b*, the outer-peripheral-side resistance heating element 24 and its terminals 25*a* and 25*b*, and the jumper lines 26*a* and 26*b* are embedded. Then, the recess 21 is formed in the rear surface of the ceramic plate over a range defining the within-shaft region 20*d*. The recess 21 can be formed by, for example, grinding, cutting, or blasting. At this time, the start point terminal 23*a* and the end point terminal 23*b* are positioned opposite to the bottom surface 21*b* of the recess 21, but those terminals remain embedded in the ceramic plate and are not exposed. Furthermore, the start point terminal and the end point terminal 25*b* are positioned opposite to the side surface 21*a* of the recess 21, but those terminals remain embedded in the ceramic plate and are not exposed. Then, the flange portion 40*a* of the tubular shaft is bonded to the rear surface of the ceramic plate having been obtained as described above. The bonding can be performed by, for example, diffusion bonding. At this time, because the terminals 23*a*, 23*b*, 25*a* and 25*b* are not exposed, those terminals are not susceptible to chemical change (for example, oxidation) caused by an atmosphere in which the diffusion bonding is performed. Then, holes are formed in the bottom surface 21*b* of the recess 21 at a position opposite to the start point terminal 23*a* and a position opposite to the end point terminal 23*b* with an ordinary drill, thus making both the terminals 23*a* and 23*b* exposed at the bottom surface 21*b*. Moreover, holes are formed in the side surface 21*a* of the recess 21 at a position opposite to the start point terminal 25*a* and a position opposite to the end point terminal 25*b* with an L-shaped drill, thus making both the terminals 25*a* and 25*b* exposed at the side surface 21*a*. Thereafter, the terminals 23*a*, 23*b*, 25*a* and 25*b* are brazed respectively to the power feeder members 42*a*, 42*b*, 44*a* and 44*b*, whereby the ceramic heater 10 is obtained.

An example of use of the ceramic heater 10 will be described below. First, the ceramic heater 10 is installed within a vacuum chamber (not illustrated), and the wafer W is placed on the wafer placement surface 20*a* of the ceramic heater 10. Then, electric power supplied to the inner-peripheral-side resistance heating element 22 is adjusted such that the temperature in the inner-peripheral-side zone Z1, detected by the inner-peripheral-side thermocouple (not illustrated), is kept at a predetermined inner-peripheral-side target temperature. Furthermore, electric power supplied to the outer-peripheral-side resistance heating element 24 is adjusted such that the temperature in the outer-peripheral-side zone Z2, detected by the outer-peripheral-side thermocouple (not illustrated), is kept at a predetermined outer-peripheral-side target temperature. Thus the temperature of the wafer W is controlled to be kept at a desired temperature. Thereafter, the interior of the vacuum chamber is evacuated to create a vacuum atmosphere or a pressure reduced atmosphere, plasma is generated inside the vacuum chamber, and CVD film formation or etching is performed on the wafer W by utilizing the generated plasma.

In the above-described ceramic heater 10 according to this embodiment, the start point terminals 25*a* and the end point terminal 25*b* through which the electric powers are supplied to the outer-peripheral-side resistance heating element 24 are disposed to be exposed at the side surface 21*a* of the recess 21. Thus, although those terminals 25*a* and 25*b* are disposed to be exposed at the within-shaft region of the rear surface of the ceramic plate in the related art, they are disposed to be exposed at the side surface 21*a* of the recess 21 in this embodiment. Accordingly, the within-shaft region 20*d* of the rear surface 20*b* of the ceramic plate 20 can be effectively utilized.

Furthermore, since the recess 21 has the size substantially equal to that of the within-shaft region 20*d*, it is possible to increase an area of the bottom surface 21*b* of the recess 21, and to effectively utilize the bottom surface 21*b* of the recess 21.

The terminals 23*a* and 23*b* of the inner-peripheral-side resistance heating element 22 disposed in the inner-peripheral-side zone Z1 and the terminals 25*a* and 25*b* of the outer-peripheral-side resistance heating element 24 disposed in the outer-peripheral-side zone Z2 are arranged in a way distributed to the side surface 21*a* of the recess 21 and the within-shaft region 20*d* of the rear surface 20*b* of the ceramic plate 20 (namely, the bottom surface 21*b* of the recess 21). Comparing with the case in which all the terminals 23*a*, 23*b*, 25*a* and 25*b* are arranged in the within-shaft region 20*d* of the rear surface 20*b* of the ceramic plate 20, therefore, the within-shaft region 20*d* can be more effectively utilized, for example, to arrange other members therein.

The terminals 25*a* and 25*b* of the outer-peripheral-side resistance heating element 24 disposed in the outer-peripheral-side zone Z2 are disposed to be exposed at the side surface 21*a* of the recess 21, and the terminals 23*a* and 23*b* of the inner-peripheral-side resistance heating element 22 disposed in the inner-peripheral-side zone Z1 are disposed to be exposed at the within-shaft region 20*d* of the rear surface 20*b* of the ceramic plate 20 (namely, the bottom surface 21*b* of the recess 21). Therefore, the distance between the start point 22*a* of the inner-peripheral-side resistance heating element 22 and the start point terminal 23*a* and the distance between the end point 22*b* of the inner-peripheral-side resistance heating element 22 and the end point terminal 23*b* are shortened, and the start or end point and the start or end point terminal of the inner-peripheral-side resistance heating element can be connected to each other directly or by a short wiring.

Moreover, the side surface 21*a* of the recess 21 is located at the position visually recognizable from the lower end side of the tubular shaft 40. Accordingly, in an operation of exposing the terminals 25*a* and 25*b* embedded in the ceramic plate 20 at the side surface 21*a* of the recess 21 by drilling, a worker can relatively easily perform the drilling while looking at the side surface 21*a* of the recess 21 from the lower end of the tubular shaft 40.

In addition, since the ceramic heater 10 includes the power feeder members 42*a*, 42*b*, 44*a* and 44*b*, the electric powers can be individually supplied to the inner-peripheral-side and outer-peripheral-side resistance heating elements 22 and 24 by using the power feeder members 42*a*, 42*b*, 44*a* and 44*b*.

The present invention is not limited to the above-described embodiment, and can be carried out by various modes as long as they belong to the technical scope of the invention.

Figure 3:
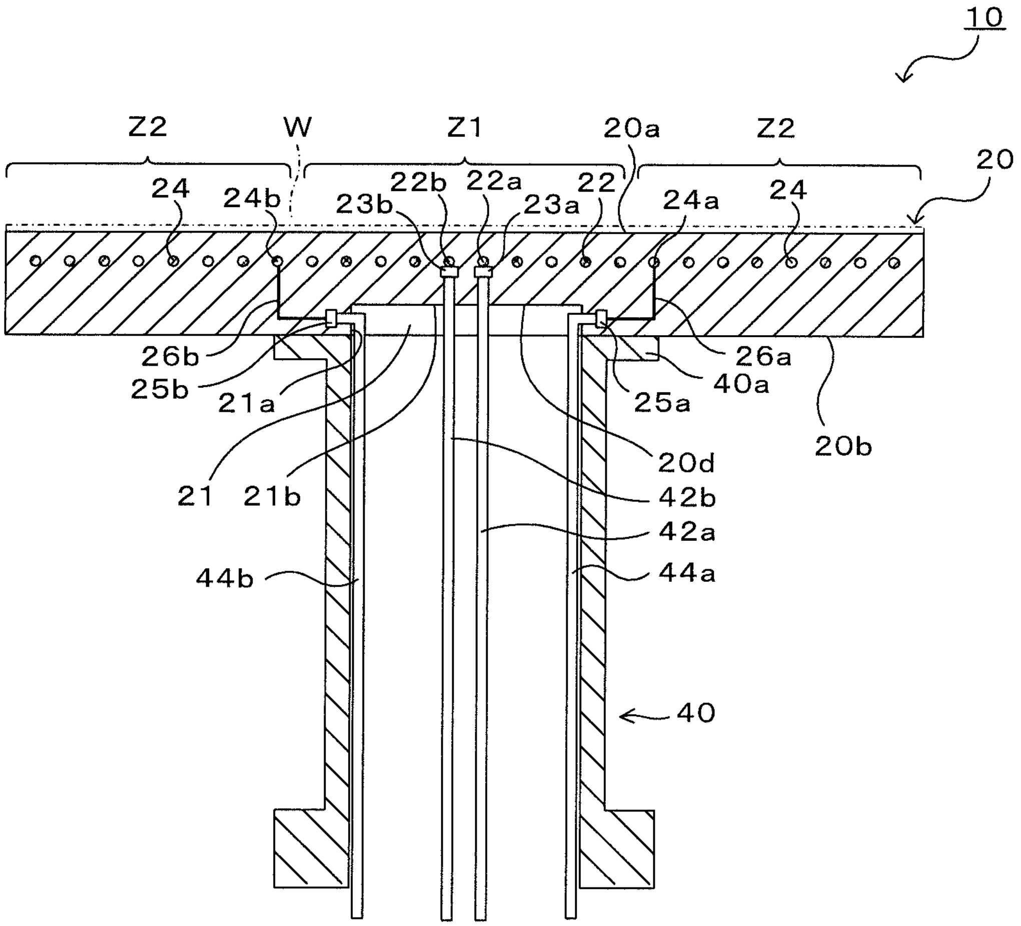
FIG. 3 is a vertical sectional view of a modification of the ceramic heater 10.

For example, in the above-described embodiment, as illustrated in FIG. 3, the power feeder members 44*a* and 44*b* connected respectively to the terminals 25*a* and 25*b* exposed at the side surface 21*a* of the recess 21 may be each disposed in a shape following an inner wall of the tubular shaft 40. In FIG. 3, the same components as those in the above-described embodiment are denoted by the same signs. In the case of FIG. 3, an inner space of the tubular shaft is increased as compared with that in the case of FIG. 2, the inner space can be effectively utilized for other purposes.

While, in the above-described embodiment, the terminals 23*a* and 23*b* of the inner-peripheral-side resistance heating element 22 are disposed to be exposed at the within-shaft region 20*d* of the rear surface of the ceramic plate 20, the terminals 23*a* and 23*b* of the inner-peripheral-side resistance heating element 22 may be disposed to be exposed at the side surface 21*a* of the recess 21.

In the above-described embodiment, the ceramic plate 20 may be fabricated by bonding an annular plate to a rear surface of a circular plate. More specifically, the ceramic plate 20 may be fabricated by vertically dividing it into upper and lower members at a horizontal plane that includes the bottom surface 21*b* of the recess 21, and by forming the upper member as the circular plate and the lower member as the annular plate, respectively. A central hole of the annular plate serves as the recess 21. The circular plate incorporates the inner-peripheral-side and outer-peripheral-side resistance heating elements 22 and 24 and vertically extending portions of the jumper lines 26*a* and 26*b*. Lower ends of the vertically extending portions of the jumper lines 26*a* and 26*b* are exposed at the rear surface of the circular plate. When bonding the annular plate to the rear surface of the circular plate, the annular plate may be bonded in a state in which horizontally extending portions of the jumper lines 26*a* and 26*b* are placed between the circular plate and the annular plate. One-side ends of the horizontally extending portions of the jumper lines 26*a* and 26*b* are connected to the lower ends of vertically extending portions, and the other-side ends of the horizontally extending portions are exposed to the recess 21. In the above-mentioned case, the annular plate may be bonded to the circular plate after forming an elongate groove in a surface of the annular plate opposite to the rear surface of the circular plate, the elongate groove extending from a side surface toward an outer periphery of the central hole of the annular plate. The elongate groove can be used to insert the thermocouple therethrough.

While, in the above-described embodiment, the resistance heating elements 22 and 24 are each in the form of a coil, the shape of the resistance heating element is not always limited to the coil. In another example, the resistance heating element may be a print pattern or may have a ribbon-like or mesh-like shape.

In the above-described embodiment, the ceramic plate 20 may incorporate an electrostatic electrode and/or an RF electrode in addition to the resistance heating elements 22 and 24.

While the so-called two-zone heater has been described, by way of example, in the above embodiment, the present invention is not always limited to the two-zone heater. In another example, the inner-peripheral-side zone Z1 may be divided into a plurality of inner-peripheral-side small zones, and the resistance heating element may be wired in a one-stroke pattern for each of the inner-peripheral-side small zones. Furthermore, the outer-peripheral-side zone Z2 may be divided into a plurality of outer-peripheral-side small zones, and the resistance heating element may be wired in a one-stroke pattern for each of the outer-peripheral-side small zones. In such a case, terminals of some of the resistance heating elements may be disposed to be exposed at the side surface of the recess, and terminals of the remaining resistance heating elements may be disposed in the within-shaft region of the rear surface of the ceramic plate. Alternatively, the terminals of all the resistance heating elements may be disposed to be exposed at the side surface of the recess.

The present application claims priority from Japanese Patent Application No. 2020-016115 filed Feb. 3, 2020, the entire contents of which are incorporated herein by reference.

What is claimed is:

1. A ceramic heater comprising:

a ceramic plate having a surface that serves as a wafer placement surface;

a resistance heating element that is embedded in the ceramic plate;

a tubular shaft that supports the ceramic plate from a rear surface of the ceramic plate;

a singular cylindrical shaped recess that is formed in a within-shaft region of the rear surface of the ceramic plate and having a constant diameter equal to a size an inside diameter of the tubular shaft, the within-shaft region being surrounded by the tubular shaft;

terminals that are disposed to be exposed at a side surface of the recess and that supply electric power to the resistance heating element; and wherein the resistance heating element includes an inner-peripheral-side resistance heating element disposed in an inner-peripheral-side zone of the wafer placement surface and an outer-peripheral-side resistance heating element disposed in an outer-peripheral-side zone of the wafer placement surface, the terminals of the outer-peripheral-side resistance heating element are embedded in the ceramic plate at positions near the side surface of the recess and are disposed to be exposed at the side surface of the recess, and the terminals of the inner-peripheral-side resistance heating element are embedded in the ceramic plate at positions near the bottom surface of the recess and are disposed to be exposed at the within-shaft region of the rear surface of the ceramic plate.

2. The ceramic heater according to claim 1, wherein the resistance heating element is disposed for each of a plurality of zones obtained by dividing the wafer placement surface, the terminals of some of the resistance heating elements disposed in the plurality of zones are disposed to be exposed at the side surface of the recess, and the terminals of the remaining resistance heating elements are disposed in the within-shaft region of the rear surface of the ceramic plate.

3. The ceramic heater according to claim 1, wherein the side surface of the recess is located at a position visually recognizable from an end portion side of the tubular shaft.

4. The ceramic heater according to claim 1, further comprising power feeder members that are connected to the terminals and that are arranged in an inner space of the tubular shaft.

5. The ceramic heater according to claim 4, wherein the power feeder members connected to the terminals exposed at the side surface are each formed in a shape following an inner wall of the tubular shaft.

6. The ceramic heater according to claim 1, wherein each of the terminals is exposed at a position deeper than the side surface of the recess.

7. The ceramic heater according to claim 6, further comprising L-shaped power feeder members that are connected to the terminals and that are arranged in an inner space of the tubular shaft.

* * * * *